Figure 1:
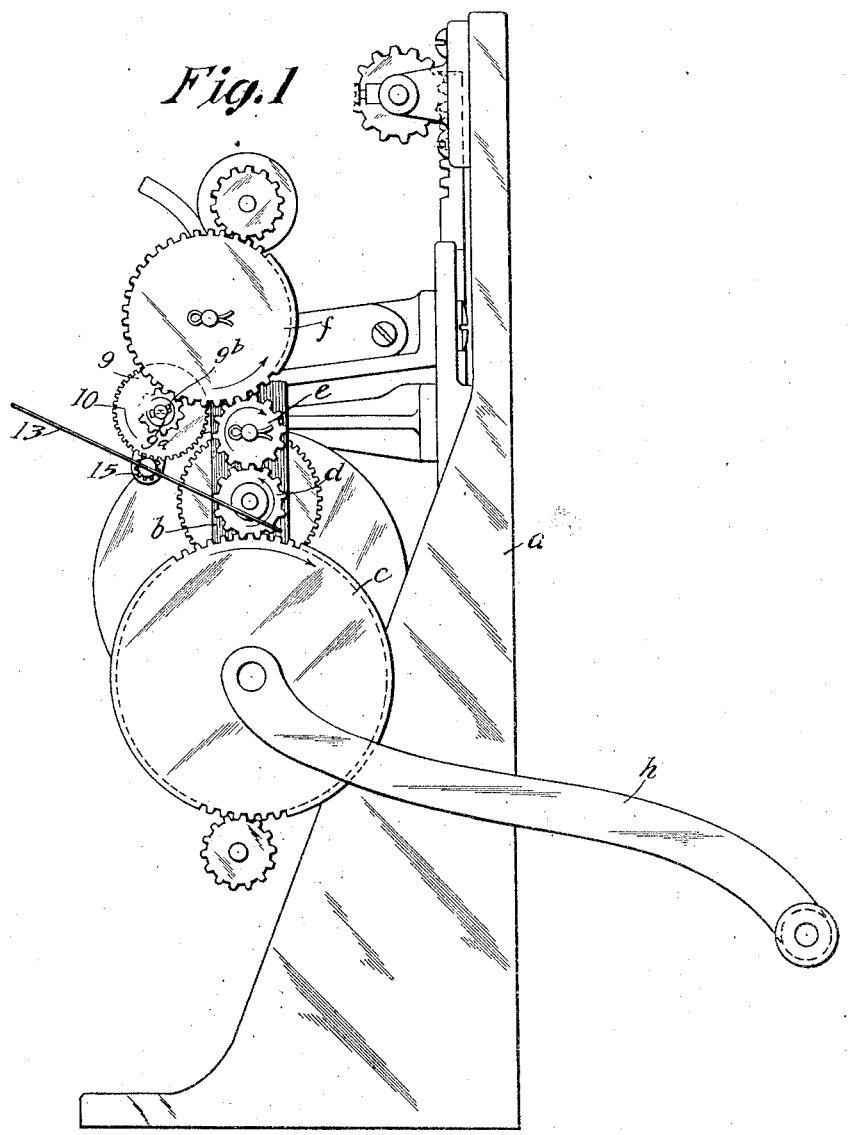

E. P. HOPKINS.
KINETOSCOPE.
APPLICATION FILED AUG. 24, 1911.

1,027,731.

Patented May 28, 1912.

2 SHEETS—SHEET 1.

Witnesses:

Inventor:
Edward P. Hopkins
by Frank L. Dyer
His Atty.

E. P. HOPKINS.
KINETOSCOPE.
APPLICATION FILED AUG. 24, 1911.
1,027,731.
Patented May 28, 1912.
2 SHEETS—SHEET 2.
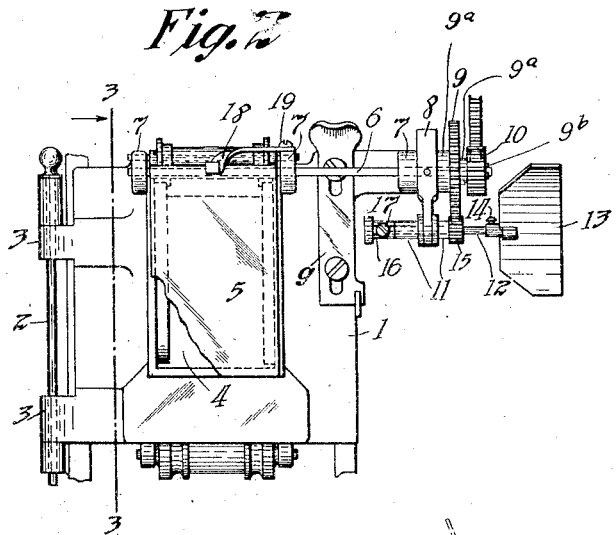
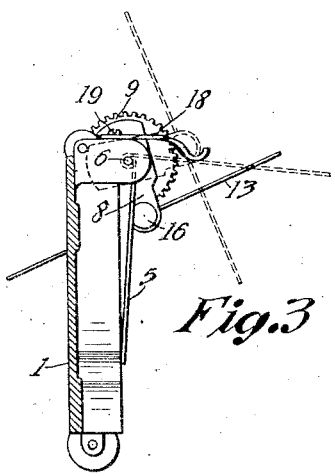

UNITED STATES PATENT OFFICE.

EDWARD P. HOPKINS, OF NEW YORK, N. Y., ASSIGNOR TO THOMAS A. EDISON, INCORPORATED, OF WEST ORANGE, NEW JERSEY, A CORPORATION OF NEW JERSEY.

KINETOSCOPE.

1,027,731.  Specification of Letters Patent.  Patented May 28, 1912.

Application filed August 24, 1911. Serial No. 645,867.

*To all whom it may concern:*

Be it known that I, EDWARD P. HOPKINS, a subject of the King of Great Britain, residing at 143 West One Hundred and Third street, New York city, borough of Manhattan, in the county of New York and State of New York, have invented certain new and useful Improvements in Kinetoscopes, of which the following is a description.

My invention relates to kinetoscopes, and particularly to the provision of a screen for protecting the moving picture film which, in the present state of the art, is composed principally of celluloid, and which, when stationary or moving at a slow rate of speed, and subjected to the heat of the projecting lamp is likely to become ignited.

My invention comprises a movable screen or shutter situated back of the projection aperture and improved means operated by the film driving mechanism for moving said screen as soon as the driving mechanism reaches a predetermined speed, whereby the projecting light will be admitted to the film, said means causing the shutter to close when the speed of the film is less than a given rate. The improved shutter and actuating means therefor are preferably all mounted upon the usual gate which forms a part of kinetoscopes now on the market, the arrangement being such that when the gate is open for the purpose of threading the film through the apparatus, the shutter actuating mechanism is disengaged from the film driving mechanism and is brought into engagement therewith by the closing of the gate, it not being necessary to remove any parts in order to permit the gate to be swung on its hinge.

In order that the invention may be more clearly understood, reference is hereby made to the accompanying drawing in which—

Figure 1 is a side elevation of a kinetoscope of the Edison type having attached thereto an automatic film protecting screen and actuating mechanism therefor constructed in accordance with my invention. Fig. 2 is a rear elevation showing the screen with its actuating mechanism and the gate upon which it is mounted, and Fig. 3 is a section on line 3, 3 of Fig. 2.

The kinetoscope shown comprises the usual body $a$ on which is mounted the adjustable frame $b$ which carries the film driving mechanism of which the gear train $c, d, e, f$ forms a part. There is also a gate 1 which is hinged to the frame $b$ by means of a rod 2 passing through apertures in the lugs 3, 3, which are integral with the said gate. The gate 1 is provided with the usual projection aperture 4 opposite the corresponding projection aperture in the body of the kinetoscope. The automatic film protecting screen 5, which is preferably a sheet of aluminum, is secured to and depends from a horizontal rock shaft 6 which is journaled in lugs 7 formed integrally with the gate 1. One end of the shaft extends beyond its bearing and carries an arm 8, a sun gear 9 and gear 10, the said arm being rigid with the shaft. The sun gear 9 is formed with a sleeve or hub $9^a$ which is journaled on the shaft 6, and the gear 10 is mounted on one end of said hub, the hub being secured against lateral movement by a pin $9^b$.

The arm 8 carries at one end a sleeve 11 in which is journaled a shaft 12. Upon one end of this shaft a fan 13 is secured by a set screw 14 and a planet gear 15, also rigid with said shaft 12, meshes with the sun gear 9. The other end of the shaft 12 is provided with a cap 16 secured by a set screw 17, whereby the said shaft is held against longitudinal shifting. The end of the arm 8 opposite that which carries the sleeve 11 acts as a counterweight for the parts carried by the said sleeve. The pivotal movement of the screen 5 is limited by means of a spring 18 secured at one end to the gate 1 by a screw 19.

The device operates as follows: When the gate 1 is swung upon its hinge into a closed position, the gear 10 is brought into mesh with the gear $f$, as shown in Fig. 1, the gate being held by the usual latch $g$, Fig. 2. The rotation of the gear $f$, when the kinetoscope is operated in the usual manner by the driving crank $h$, causes rotation to be imparted to said gears 10 and 9. The latter causes the rapid rotation of the gear 15, shaft 12 and fan 13. The fan offers a substantial resistance to the rotation of the gear 15 and shaft 12. By reason of said resistance, the gear 15, which is mounted as planet gear with respect to the sun gear 9 rides up around the same from the position shown in full lines, Fig. 3, to that shown in dotted lines, thereby moving the arm 8, and through the rock shaft 6 connection, the screen 5 into the positions shown also in dotted lines. The parts mentioned are maintained in such position as long as the driving speed of the gears 10, 9, and 15 remains at a predetermined rate which will be that suitable for the exhibition of the pictures on the film. In case said speed falls below the given rate or the operator ceases to drive the mechanism, the force of gravity restores the parts to their original positions, in which case the screen 5 closes the opening 4 in the gate and cuts off the projecting light from the film. The movement of the screen 5, shaft 6, arm 8 and parts carried thereby, is limited by the spring stop 18.

Having now described my invention, what I claim is:

1. In a kinetoscope provided with a projection aperture, a screen normally covering said aperture, and mechanism for operating the same comprising a planet gear and means for offering a substantial resistance to the rotation thereof, substantially as set forth.

2. In a kinetoscope provided with a projection aperture, a screen normally covering said aperture, and mechanism for operating the same comprising a planet gear and a fan for offering a substantial resistance to the rotation thereof, substantially as set forth.

3. In a kinetoscope provided with a projection aperture, a pivotal screen normally covering said aperture, and mechanism for operating the same comprising a sun gear concentric with the pivot of the screen, an arm connected to said screen and a planet gear mounted on said arm, substantially as set forth.

4. In a kinetoscope provided with a projection aperture, a pivotal screen normally covering said aperture, and mechanism for operating the same comprising a sun gear concentric with the pivot of the screen, an arm connected to said screen, a planet gear mounted on said arm, and means for offering a substantial resistance to the rotation of said planet gear, substantially as set forth.

5. In a kinetoscope provided with a projection aperture, a pivotal screen normally covering said aperture, and mechanism for operating the same comprising a sun gear concentric with the pivot of the screen, an arm connected to said screen, a planet gear mounted on said arm, and a fan for offering a substantial resistance to the rotation of said planet gear, substantially as set forth.

6. In a kinetoscope provided with a projection aperture, a rock shaft, a screen depending therefrom and covering said aperture, an arm and a sun gear on said rock shaft, a planet gear mounted on said arm engaging said sun gear, and means for offering a substantial resistance to the rotation of said planet gear, substantially as set forth.

7. In a kinetoscope provided with a projection aperture, a rock shaft, a screen depending therefrom and covering said aperture, a counterweighted arm and a sun gear on said rock shaft, a planet gear mounted on said counterweighted arm engaging said sun gear, and means for offering a substantial resistance to the rotation of said planet gear, substantially as set forth.

8. In a device of the character described, a rock shaft, an arm rigid therewith, a sun gear journaled on said shaft, and a planet gear carried by said arm and meshing with said sun gear, substantially as set forth.

9. In a kinetoscope, a frame, a gate hinged thereto and carrying a rock shaft, an arm rigid therewith, a sun gear journaled on said shaft, and a planet gear carried by said arm and meshing with said sun gear, substantially as set forth.

10. In a kinetoscope, a frame carrying film driving mechanism, a gate hinged thereto and carrying a screen and actuating mechanism therefor comprising a rock shaft, an arm rigid therewith, a sun gear journaled on said shaft, and a planet gear carried by said arm and meshing with said sun gear, said screen actuating mechanism being so arranged as to be connected in driven relation to said film driving mechanism when the gate is closed, substantially as set forth.

11. In a kinetoscope, the combination of a frame, an apertured gate hinged thereto, a screen mounted on said gate and normally positioned to close the aperture therein, revoluble means for feeding a picture film past said aperture, a rotary fan adapted to be operated by said feeding means, and a connection between said fan and said screen whereby said screen will be removed from said aperture when the film feeding mechanism has attained a predetermined speed, substantially as set forth.

12. The combination with a rotary shaft of a moving picture machine, of a sun and planet gear driven by said rotary shaft, and a screen connected to said planet gear and moved out of its closed position whenever the planet gear is driven at a predetermined speed substantially as set forth.

13. The combination with a rotary shaft of a moving picture machine, of a sun and planet gear driven by said rotary shaft, a fan driven by said planet gear and a screen connected to said planet gear and moved out of its closed position whenever the planet gear is driven at a predetermined speed, substantially as set forth.

14. A kinetoscope having a main frame provided with a film driving mechanism including a gear, a gate hinged to the frame, a movable screen and mechanism for operating the screen including a sun and planet gear, the said screen and the sun and planet gear being mounted on and carried by the said gate, and means for operating said sun gear located to mesh with the gear of the film driving mechanism when the gate is in closed position, substantially as set forth.

This specification signed and witnessed this 17th day of August 1911.

EDWARD P. HOPKINS.

Witnesses:
HENRY C. KENNEDY,
CHARLES J. KINTNER.